United States Patent
Yoriki (10) Patent No.: US 10,996,657 B2
(45) Date of Patent: May 4, 2021

(54) UNIT SPECIFIC INFORMATION MANAGEMENT SYSTEM

(71) Applicant: FUJI CORPORATION, Chiryu (JP)

(72) Inventor: Minoru Yoriki, Anjo (JP)

(73) Assignee: FUJI CORPORATION, Chiryu (JP)

( * ) Notice: Subject to any disclaimer, the term of this patent is extended or adjusted under 35 U.S.C. 154(b) by 128 days.

(21) Appl. No.: 15/764,535

(22) PCT Filed: Oct. 28, 2015

(86) PCT No.: PCT/JP2015/080442
§ 371 (c)(1),
(2) Date: Mar. 29, 2018

(87) PCT Pub. No.: WO2017/072887
PCT Pub. Date: May 4, 2017

(65) Prior Publication Data
US 2018/0284730 A1 Oct. 4, 2018

(51) Int. Cl.
*G05B 19/418* (2006.01)
*G06Q 50/04* (2012.01)
*G06Q 10/08* (2012.01)

(52) U.S. Cl.
CPC ..... *G05B 19/4183* (2013.01); *G05B 19/4185* (2013.01); *G05B 19/41815* (2013.01);
(Continued)

(58) Field of Classification Search
CPC .. G05B 19/4185; H04W 56/001; Y02P 90/30; A63F 2300/408; G06Q 10/08
(Continued)

(56) References Cited

U.S. PATENT DOCUMENTS 7,142,939 B2 * 11/2006 Nonaka ............ G05B 19/41805
 700/121
7,840,640 B2 * 11/2010 Kashitani ................ A63F 13/12
 709/206

(Continued)

FOREIGN PATENT DOCUMENTS

| JP | 2014-154056 A | 8/2014 |
| WO | WO 2014/061072 A1 | 4/2014 |
| WO | WO 2015/063880 A1 | 5/2015 |
| WO | WO 2015/118632 A1 | 8/2015 |

OTHER PUBLICATIONS

Peer-to-peer—Wikipedia, http://en.wikipedia.org/w/index.php?title=Peer-to-peer&oldid=679010028, XP 55574118A, Sep. 1, 2015, 15 pages.

(Continued)

*Primary Examiner* — William G Trost, IV
*Assistant Examiner* — Christopher P Cadorna
(74) *Attorney, Agent, or Firm* — Oblon, McClelland, Maier & Neustadt, L.L.P.

(57) ABSTRACT

Multiple component mounters connected via a network are able to have multiple units attached. A control device of each component mounter requests other component mounters to send the specific information and the update date and time of a unit corresponding to the unit ID read by an ID reading section from an ID recording section of the unit set on the component mounter, and in certain cases a request is sent to the other component mounters to send the specific information of the unit, and the specific information of the unit and the update date and time of the specific information sent from the other component mounter in accordance with the request are stored in the storing section of the component mounter that issued the request.

6 Claims, 7 Drawing Sheets

(52) U.S. Cl.
CPC ............. *G06Q 10/08* (2013.01); *G06Q 50/04*
(2013.01); *Y02P 90/30* (2015.11)

(58) Field of Classification Search
USPC .......................................... 709/248
See application file for complete search history.

(56) References Cited

U.S. PATENT DOCUMENTS

| | | | |
|---|---|---|---|
| 2007/0121661 A1* | 5/2007 | Ohta ..................... | H04J 3/0632 370/412 |
| 2014/0290055 A1 | 10/2014 | Kurata | |
| 2015/0081079 A1* | 3/2015 | Asakura ............. | G05B 19/4083 700/114 |
| 2016/0255755 A1 | 9/2016 | Iisaka | |
| 2017/0322548 A1* | 11/2017 | Ohashi ................... | H05K 13/02 |

OTHER PUBLICATIONS

International Search Report dated Jan. 26, 2016 in PCT/JP2015/080442 filed Oct. 28, 2015.

Yuji Watanabe, "Renzoku/Batch Unten no Shin Kyokumen—MES no Saiteki Un'yo to Gyomu Sagyo Shien, soshite Gijutsu Densho e—" Instrumentation Control Engineering, vol. 49, No. 9, Aug. 22, 2006, 10 Pages (with English language introduction).

Yuji Watanabe, et al., "Development of Real Time SQL Generation Module for Industrial Equipment" Transactions of Information Processing Society of Japan, vol. 2, No. 2, 2009, 12 Pages (with English Abstract).

Extended European Search Report dated Jul. 10, 2018 in Patent Application No. 15907251.1, 9 pages.

* cited by examiner

UNIT SPECIFIC INFORMATION MANAGEMENT SYSTEM

TECHNICAL FIELD

The present application relates to a unit specific information management system for managing specific information of multiple units that are attachable to any one of multiple devices that are connected via a network.

BACKGROUND ART

Conventionally, in the field of production technology, production is managed by connecting multiple devices via a network. For example, for a component mounting line that produces boards mounted with components, as disclosed in patent literature 1 (WO2014-061072), multiple component mounters are connected to a production management computer (host computer) via a network, and identification information (feeder ID) of feeders set on each of the component mounters and identification information (component ID) of supplied components are sent to the production management computer, and it is checked whether the components supplied by a given feeder are the components specified in the production job (production program).

Also, because the feeders can be set on any one of the multiple component mounters, specific information (for example, calibration data, control parameters, initial values, or the like) of a feeder set on one of the component mounters is similarly required for other component mounters. Therefore, the specific information of the feeder is managed in one of the following three ways (1) to (3).

(1) Specific information of multiple feeders to be used in production is saved in advance linked to a feeder ID on a storage device of a production management computer connected to multiple component mounters via a network, the ID of a feeder set on the component mounter is sent to the production management computer, a sending of the specific information of the feeder corresponding to the feeder ID is requested, and the specific information of the feeder is sent to the component mounter from the production management computer based on the request.

(2) Non-volatile memory for saving specific information of a feeder is provided on each of the multiple feeders, and when the feeder is set on the component mounter, the component mounter reads the specific information of the feeder from the non-volatile memory of the feeder.

(3) An operator manually enters the specific information of the feeder set on the component mounter to the component mounter.

CITATION LIST

Patent Literature
    Patent literature 1: WO2014-0610172

BRIEF SUMMARY

Technical Problem

However, with management method (1) above, because specific information of all feeders used on multiple component mounters is saved on one storage device, if that storage device breaks, none of the component mounters can acquire the specific information of the feeders, leading to a disadvantage in that production cannot be started.

Also, with management method (2) above, because non-volatile memory for saving specific information of a feeder is provided on each feeder, the feeders are more expensive.

Further, with management method (3) above, an operator must manually enter the specific information of the feeders, which as well as being troublesome, leads to the possibility of human input errors.

Note that, units that can be exchanged between multiple component mounters are not only feeders, but also, for example, mounting heads, XY robots, and nozzle changers (nozzle stations), and similar to specific information of a feeder, specific information of these units also needs to be managed.

Solution to Problem

To solve the above problems, the present disclosure describes a unit specific information management system for managing specific information of multiple units that are configured to be exchangeably attached to any one of multiple devices connected via a network, wherein each of the units is provided with an ID recording section configured to store or record identification information (hereinafter "unit ID") of the units, each of the devices is provided with an ID reading section configured to read the unit ID from the ID storing means of the unit set on the device, and a non-volatile storing section configured to rewritably store the specific information of the unit and an update date and time (timestamp) of the specific information linked to the unit ID, and each device is configured to issue a request to another device connected via a network to send the update date and time of the specific information of the unit corresponding to the unit ID read by the ID reading section from the ID recording section of the unit set on the device, and in a case in which the update date and time of the specific information of the unit sent from the other device in accordance with the request is more recent than the update date and time of the specific information of the unit stored in the storing section of the device that issued the request, or in a case in which the specific information of the unit is not stored in the storing section of the device that issued the request, the device requests the other device to send the specific information of the unit, and the device stores the specific information of the unit and the update date and time sent from the other device in accordance with the request in the storing section of the device.

With the present disclosure, a non-volatile storing section configured to rewritably store specific information of a unit and an update date and time of the specific information linked to a unit ID is provided on each of multiple devices connected via a network, and each device, when acquiring specific information of the unit loaded on the device, acquires the specific information for which the update date and time is most recent from the specific information of the unit stored in the non-volatile storing sections of the multiple devices, therefore, each device is able to control operation of the unit using the specific information with the most recent update date and time stored in the storing sections of other devices. Further, because the specific information of the unit and the update date and time of the specific information are stored in the storing section of each of the multiple devices linked to the unit ID, even in a case in which the storing section of one of the devices breaks, backup is possible using storage data of the storing section of another device, resulting in better failsafe ability of the system, without requiring non-volatile memory for saving the specific information to be provided in each unit, thereby satisfying a demand of lower costs for the units. Also, troublesome work of an operator entering specific information of a unit manually does not need to be performed, improving productivity, and also preventing human input errors.

With the above configuration, a request to send the update date and time of the specific information of the unit and a request to send the specific information of the unit are issued to the other devices separately, but with the present disclosure, the request to send the specific information of the unit and the update date and time of the specific information of the unit may be issued to the other devices at the same time, and in a case in which the update date and time of the specific information of the unit sent from the other device is more recent than the update date and time of the specific information of the unit stored in the storing section of the device that issued the request, or in a case in which the specific information of the unit is not stored in the storing section of the device that issued the request, the device may store the specific information of the unit and the update date and time sent from the other device in its own storing section.

Also, each of the devices, in a case in which the specific information of the unit set on the device is measured, may store the specific information of the unit and the update date and time of the specific information linked to the unit ID in the storing section of the device itself, and send the specific information of the unit, the update date and time of the specific information, and the unit ID to the other device connected via the network and store the specific information of the unit, the update date and time of the specific information, and the unit ID in the storing section of the other device. Thus, every time specific information of a unit is measured at one of the multiple devices connected via the network, because the specific information of the unit and the update date and time stored in the storing section of all the devices connected via the network are updated, the specific information of the unit and the update date and time stored in the storing section of all the devices are always updated with the most recent data.

Also, each of the devices, when acquiring the specific information of the unit corresponding to the unit ID read by the ID reading section from the ID recording section of the unit set on the device, acquires the specific information for which the update date and time is most recent from the specific information of the unit stored in the storing sections of all the devices connected via the network, or acquires the specific information of the unit by measuring the specific information of the unit. Thus, each device is always able to acquire the most recent specific information when acquiring the specific information of the unit set on the device itself.

The present disclosure, so long as it is a system for managing specific information of multiple units exchangeably attached to any one of multiple devices connected via a network, may be applied to any types of devices and units, for example, for a component mounter, because component supply devices, mounting heads, nozzle changers, and XY robots are exchangeable; when applying the present disclosure to a system in which multiple component mounters are connected via a network, each of a component supply device, a mounting head, a nozzle changer, and an XY robot may be considered to be a "unit", and the specific information of the those units and the update date and time may be managed linked to unit IDs of the units.

DESCRIPTION OF EMBODIMENTS

A first and a second embodiment of the present disclosure are described below as applied to a network system in a factory for producing boards mounted with components.

Embodiments

A first embodiment of the present disclosure will be described based on FIGS. 1 to 5. First, the configuration of a network system inside a factory that produces boards mounted with components is described based on FIG. 1.

Figure 1:
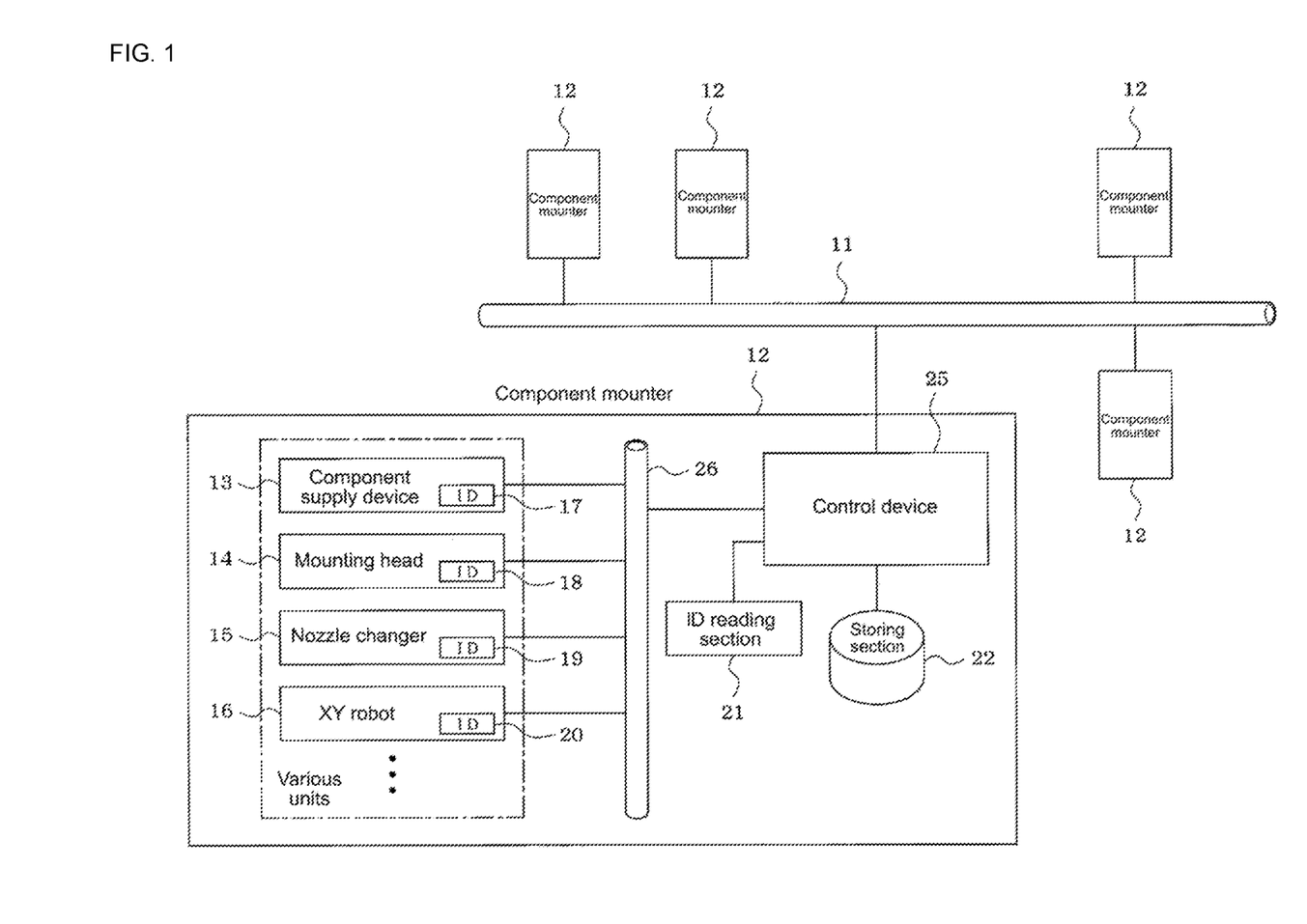
FIG. 1 is a block diagram showing the configuration of a component mounting system that is a first embodiment of the present disclosure.

Multiple component mounters 12 (devices) connected via network 11 are provided inside a factory that produces boards mounted with components, and these multiple component mounters 12 are able to communicate with each other via network 11. Multiple units are exchangeably attached to each of the multiple component mounters 12. Here, as examples of exchangeably attached units, there are: component supply device 13 such as a tape feeders, a tray feeder, a bulk feeder, a stick feeder, or a die supply device that supplies components to component mounter 12; mounting head 14 that picks up components supplied from component supply device 13 and mounts the components on a circuit board; nozzle changer 15 on which are loaded suction nozzles to be exchanged with suction nozzles that are exchangeably held on mounting head 14; capacity-expanding XY robot 16 that moves mounting head 14 in the XY directions; an inspection device (not shown) that inspects the mounting state of components on the circuit board; and an imaging device (not shown) that images components and the like. In the descriptions below, component supply device 13, mounting head 14, nozzle changer 15, and XY robot 16 are sometimes collectively referred to as units 13 to 16.

Each unit 13 to 16 is respectively provided with an ID recording section 17 to 20 on which is stored or recorded identification information (also referred to as "unit ID") of the units 13 to 16. Here, each ID recording section 17 to 20 is configured from non-volatile memory or an electronic tag (such as an RF tag, wireless tag, IC tag, or electromagnetic tag) on which the unit ID is stored, or a code label or the like on which is recorded a barcode, 2D code, or the like containing the unit ID.

On the other hand, each of the component mounters 12 connected via network 11 is provided with ID reading section 21 that reads the unit ID from ID recording section 17 to 20 of unit 13 to 16 set on the component mounter 12, and non-volatile storing section 22 that rewritably stores specific information of unit 13 to 16 and the update date and time (time stamp) of the specific information linked to the unit ID. Rewritable non-volatile storing section 22 may be, for example, a hard disk or magneto-optical, or a non-volatile semiconductor memory such as flash memory or EEPROM. Rewritable non-volatile storing section 22 may be configured using empty space on a storage device such as a hard disk that saves a control program for controlling operation of each component mounter 12 and various other data, or may be configured from a dedicated storage medium provided as rewritable non-volatile storing section 22.

Here, when ID recording section 17 to 20 is configured from non-volatile memory or an electronic tag, when each unit 13 to 16 has been set (or as each unit is set) on component mounter 12, ID reading section 21 may communicate via wire or wirelessly with ID recording section 17 to 20 so as to read the unit ID from ID recording section 17 to 20. Also, in a case in which ID recording section 17 to 20 is configured from a code label or the like on which is recorded a barcode, 2D code or the like containing the unit ID, when each unit 13 to 16 has been set (or as each unit is set) on component mounter 12, ID reading section 21 may optically inspect a surface of ID recording section 17 to 20 so as to read the unit ID. Alternatively, a mark imaging camera for imaging reference marks of circuit boards and the like may be used as ID reading section 21, and a surface of ID recording section 17 to 20 may be imaged by this camera and the unit ID read by performing processing of the image.

Also, specific information of unit 13 to 16 rewritably stored on non-volatile storing section 22 may be, for example, calibration data, control parameters, or initial values. Calibration data is for correcting control errors arising from manufacturing tolerances of and changes over time to unit 13 to 16, and is measured during a post-manufacturing inspection (adjustment) process of unit 13 to 16, or during a preparation stage before starting production (before operation of component mounter 12). Control parameters are fixed parameters or control gain parameters used for control of each unit 13 to 16, and initial values are set by initial processing (initialization processing) when power is turned on to each of the units 13 to 16.

Control device 25 of each component mounter 12 is connected to each unit 13 to 16 via network 26 inside component mounter 12, and controls operation of each unit 13 to 16 during operation (during production) of each component mounter 12, such that components supplied by component supply device 13 are picked up by mounting head 14 and mounted on a circuit board, and, in a case in which a suction nozzle exchangeably held on mounting head 14 is to be exchanged, moves mounting head 14 above nozzle changer 15 using XY robot 16, and exchanges a suction nozzle held by mounting head 14 for a suction nozzle in nozzle changer 15.

Figure 2:
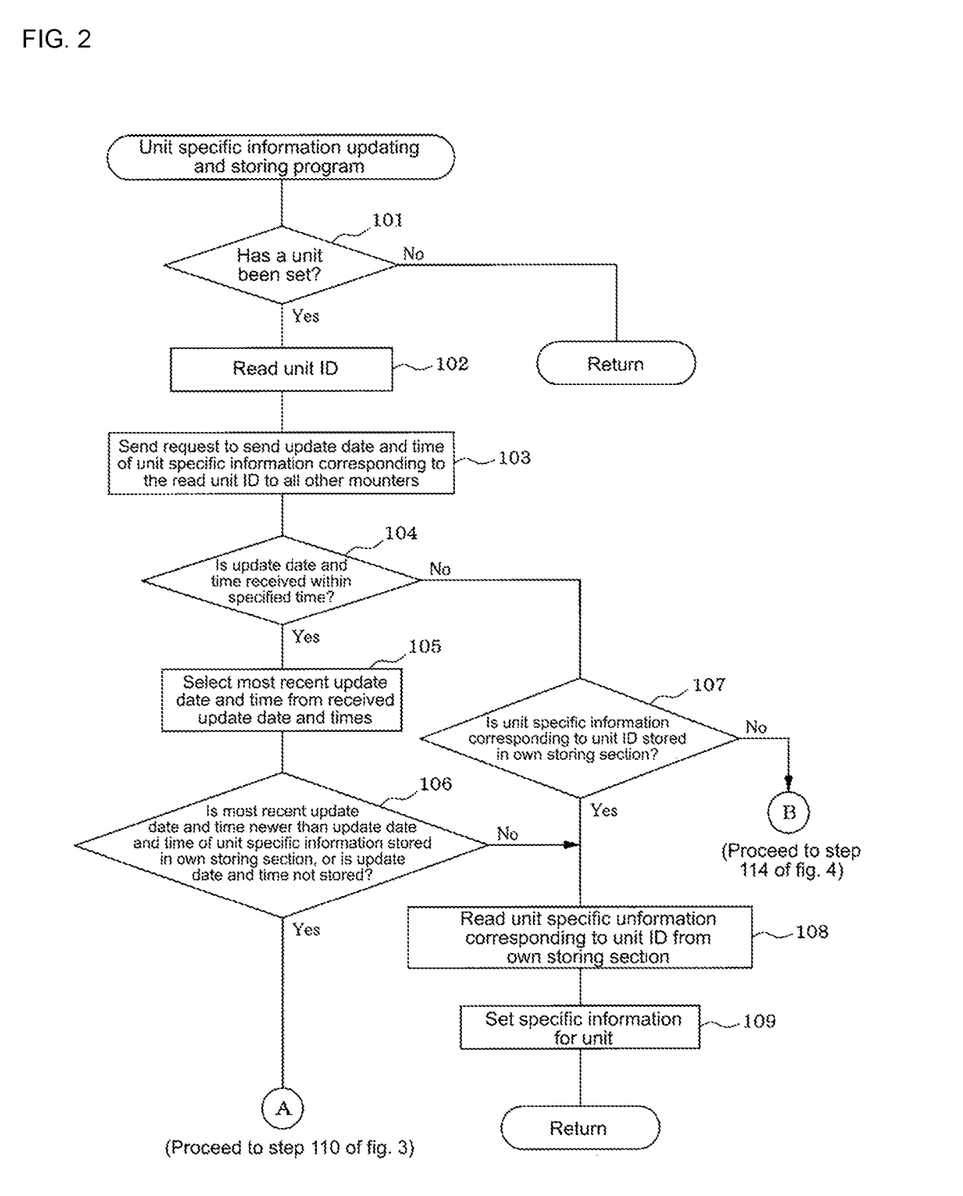
FIG. 2 is a (first) flowchart showing a flow of processing of a unit specific information updating and storing program of the first embodiment.
Figure 3:
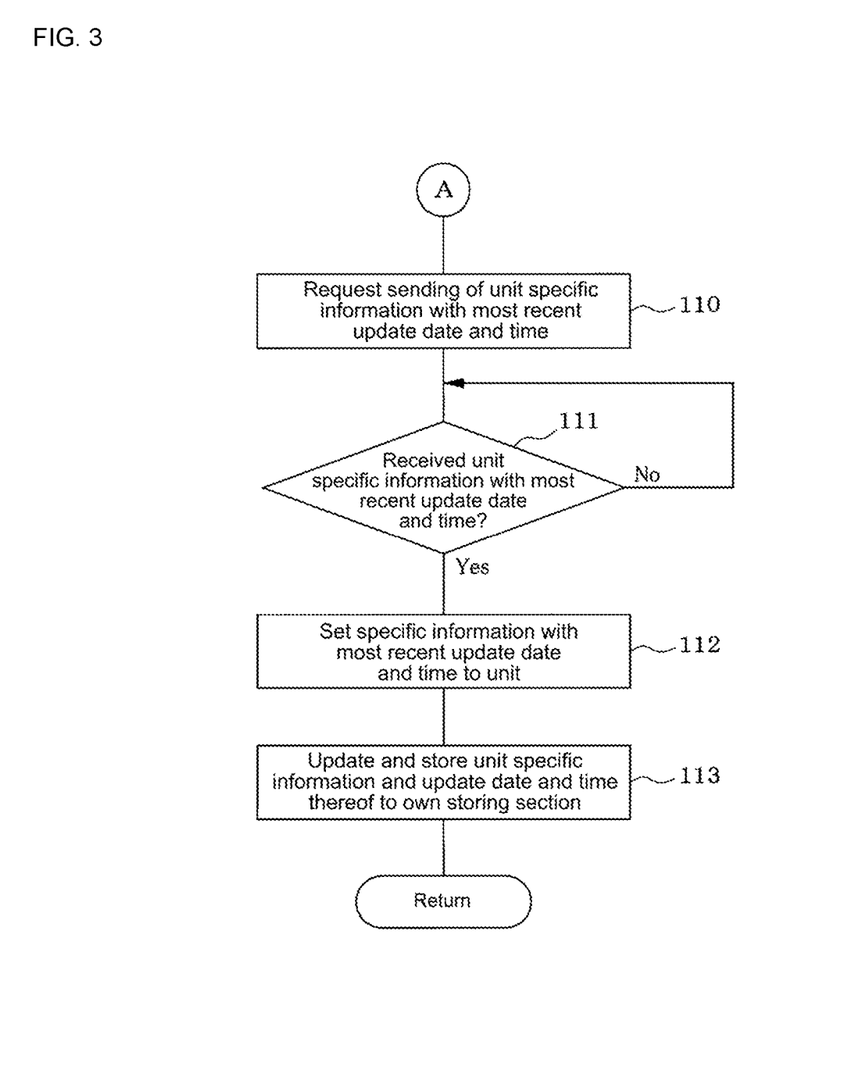
FIG. 3 is a (second) flowchart showing a flow of processing of a unit specific information updating and storing program of the first embodiment.
Figure 4:
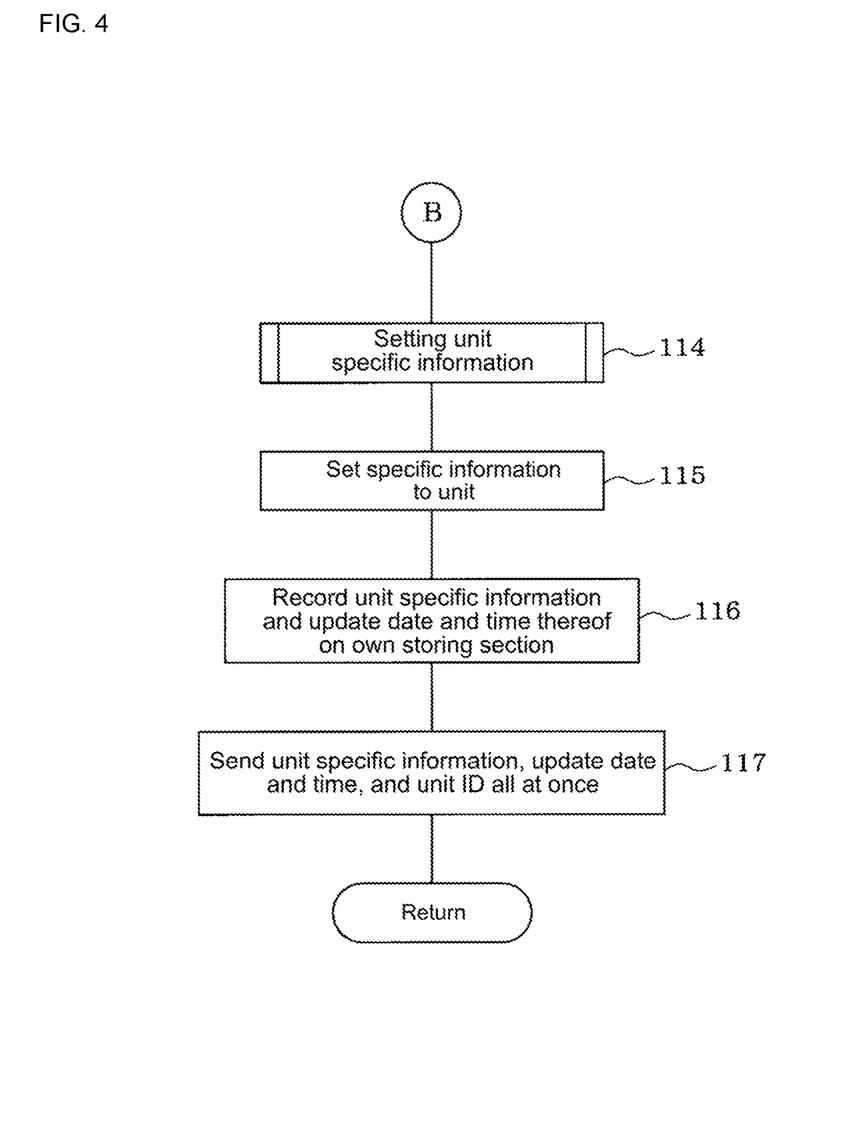
FIG. 4 is a (third) flowchart showing a flow of processing of a unit specific information updating and storing program of the first embodiment.
Figure 5:
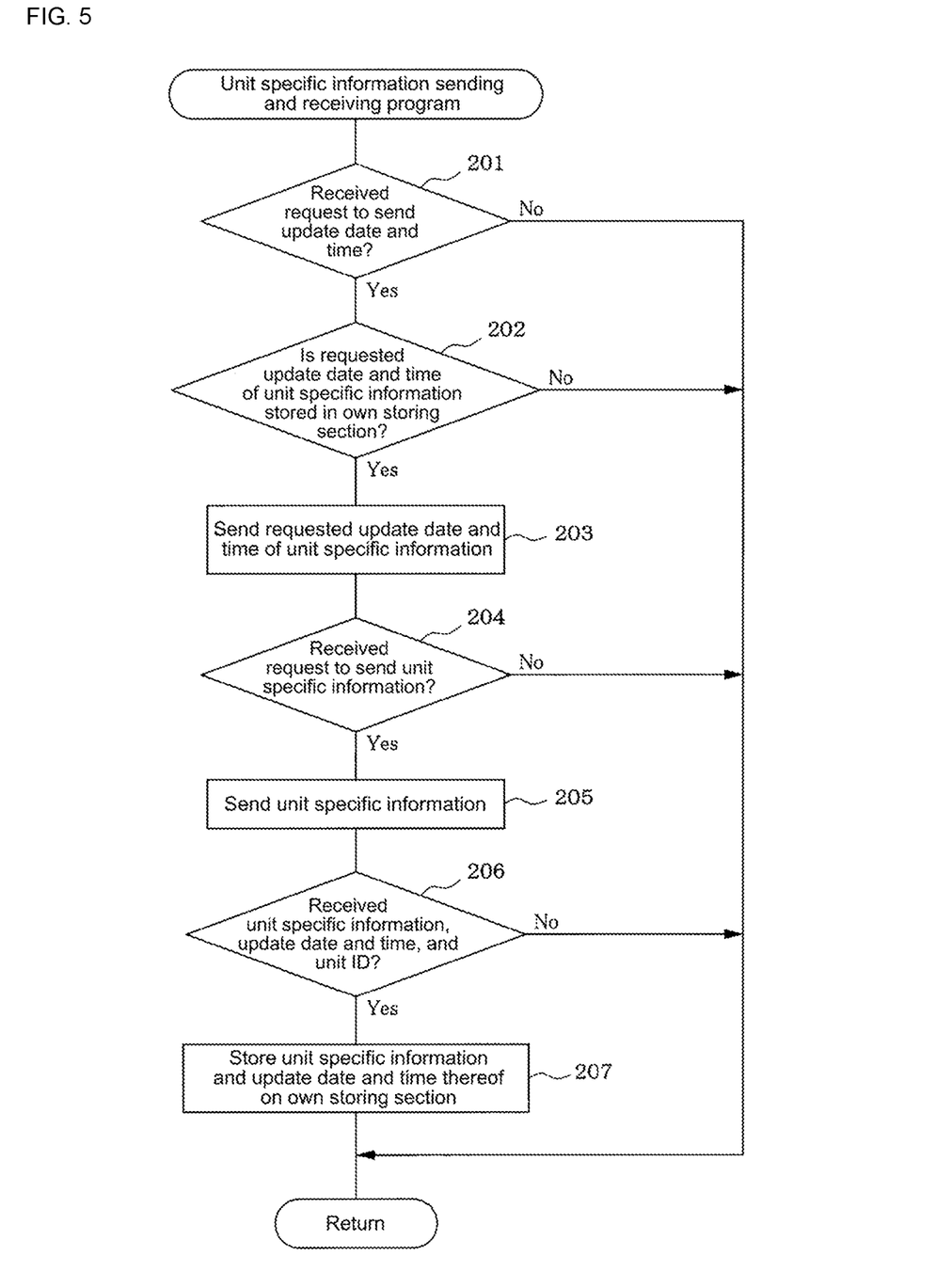
FIG. 5 is a flowchart showing a flow of processing of a unit specific information sending and receiving program of the first embodiment.

Further, control device 25 of each component mounter 12, by periodically performing the unit specific information updating and storing program and the unit specific information sending and receiving program of FIGS. 2 and 4, and the unit specific information sending and receiving program of FIG. 5, requests sending the update date and time of the specific information of unit 13 to 16 corresponding to the unit ID read by ID reading section 21 from ID recording section 17 to 20 of unit 13 to 16 set on each component mounter 12 to other component mounters 12 connected via network 11, and in a case in which the update date and time of the specific information of the unit 13 to 16 sent from the other component mounter 12 in accordance with the request is more recent than the update date and time of the specific information of the unit 13 to 16 stored in storing section 22 of the component mounter 12 that issued the request, or in a case in which the specific information of the unit 13 to 16 is not stored in storing section 22 of the component mounter 12 that issued the request, a request is sent to the other component mounters 12 to send the specific information of the unit 13 to 16, and the specific information of the unit 13 to 16 and the update date and time of the specific information sent from the other component mounter 12 in accordance with the request are stored in storing section 22 of the component mounter 12 that issued the request. Control device 25 of each component mounter 12 controls operation of each unit 13 to 16 using the specific information of each unit 13 to 16 obtained as described above. Processing of the programs of FIGS. 2 to 5 is described below.

Unit Specific Information Updating and Storing Program

The unit specific information updating and storing program of FIGS. 2 and 3 is performed periodically by control device 25 of each component mounter 12 connected via network 11. When the program is started, first, in step 101, it is determined whether a unit (any of units 13 to 16) has been set on component mounter 12, and if no unit has been set, the program ends without performing subsequent processing.

Then, when a unit has been set on component mounter 12, processing proceeds to step 102, and the unit ID is read from the ID recording section (one of sections 17 to 20) of the unit that was set by ID reading section 21 of component mounter 12. Next, proceeding to step 103, a request to send the update date and time of the unit specific information corresponding to the read unit ID is sent all at once to all the other component mounters 12 (simultaneous sending) connected via network 11, and in step 104 it is determined whether the update date and time of the unit specific information corresponding to the unit ID has been received within a specified time. Here, a "specified time" is a time required to complete receiving of the update date and time of the unit specific information sent from all the other component mounters 12 connected via network 11.

If it is determined in step 104 that the received update date and time of the unit specific information corresponding to the unit ID has been received within the specified time, processing proceeds to step 105, the most recent update date and time from the received update date and times of the unit specific information is selected, and in step 106 it is determined whether the selected most recent update date and time is more recent than the update date and time of the unit specific information stored in storing section 22 of the component mounter 12 that issued the request, or whether the unit specific information is not stored in the storing section of the component mounter 12 that issued the request.

In a case in which the received most recent update date and time is more recent than the update date and time of the unit specific information stored in storing section 22 of the component mounter 12 that issued the request, or in a case in which the unit specific information is not stored in the storing section of the component mounter 12 that issued the request, "Yes" is determined in the above step 106, processing proceeds to step 110 of FIG. 3, and a request to send the unit specific information with the most recent update date and time is sent to the component mounter 12 in which is stored the unit specific information with the most recent update date and time. Then, in step 111, processing stands by until the unit specific information with the most recent update date and time sent from the component mounter 12 is received.

Next, when the unit specific information with the most recent update date and time is received, processing proceeds to step 112, the unit specific information with the most recent update date and time is set for the unit, and in step 113, the unit specific information and the update date and time are stored in storing section 22 of the component mounter 12 that issued the request, and the programs ends.

On the other hand, if "No" is determined in step 104 of FIG. 2 above, that is, if it is determined that the update date and time of the unit specific information corresponding to the unit ID was not received within the specified time, it is determined that the unit specific information corresponding to the unit ID is not stored in any of the other component mounters 12, processing proceeds to step 107, and it is determined whether the unit specific information corresponding to the unit ID is stored in storing section 22 of the component mounter 12 that issued the request. If it is determined that the unit specific information corresponding to the unit ID is stored in storing section 22 of the component mounter 12 that issued the request, processing proceeds to step 108, and the unit specific information corresponding to the unit ID is read from storing section 22 of the component mounter 12 that issued the request, and in step 109, this unit specific information is set for the unit, then the program ends.

Further, if "No" is determined in the above step 106, that is, also in a case in which the most recent update date and time of the unit specific information received from the other component mounters 12 is older than the update date and time of the unit specific information stored in storing section 22 of the component mounter 12 that issued the request, processing proceeds to step 108, and the unit specific information corresponding to the unit ID is read from storing section 22 of the component mounter 12 that issued the request, and in step 109, this unit specific information is set for the unit, then the program ends.

On the other hand, if "No" is determined in the above step 104 and in the above step 107, that is, in a case in which unit specific information corresponding to the unit ID is not stored in storing section 22 of any of the component mounters 12, processing proceeds to step 114 of FIG. 4, and the unit specific information is measured. This measurement of the unit specific information may be performed automatically by component mounter 12, or may be performed manually by an operator using measurement tools and the like. Here, the unit specific information may be measured with the unit attached as is to component mounter 12, or the unit specific information may be measured with the unit temporarily removed from the component mounter 12.

After measuring the unit specific information, processing proceeds to step 115, the measured unit specific information is set for the unit, and in step 116, the unit specific information and the update date and time of the unit specific information are stored in storing section 22 of the component mounter 12 linked to the unit ID. Then, proceeding to step 117, the unit specific information, the update date and time, and the unit ID are sent all at once to all the other component mounters 12 connected via network, then the program ends.

Unit Specific Information Sending and Receiving Program

The unit specific information sending and receiving program of FIG. 5 is performed periodically by control device 25 of each component mounter 12 connected via network 11. When the program is started, first, in step 201, it is determined whether a sending request for the update date and time of unit specific information sent from another component mounter 12 connected via network 11 has been received, and if it has not been received, the program ends without performing subsequent processing.

Then, when the sending request of the update date and time of the unit specific information is received, proceeding to step 202, it is determined whether the requested update date and time of the unit specific information is stored in storing section 22 of the component mounter 12, and if it is not stored, because the requested unit specific information cannot be sent, the program ends without performing subsequent processing.

In contrast, if it is determined in the above step 202 that the requested update date and time of the unit specific information is stored in storing 22 of the component mounter 12, processing proceeds to step 203, and the requested update date and time of the unit specific information is sent to the component mounter 12 that issued the request. Then, proceeding to step 204, it is determined whether a sending request of the unit specific information sent from the component mounter 12 that issued the sending request for the update date and time has been received, and if it has not been received, because there is no need to send the unit specific information, the program ends without performing subsequent processing.

Then, when the sending request of the unit specific information has been received, proceeding to step 205, the unit specific information read from storing section 22 of the component mounter 12 is sent to the component mounter 12 that issued the request. Next, proceeding to step 206, it is determined whether the unit specific information, the update date and time, and the unit ID sent all at once from the other component mounters 12 when the unit specific information was measured at the other component mounter 12 has been received, and if it has not been received, the programs ends as is, but if it has been received, processing proceeds to step 207, the unit specific information and the update date and time are stored in storing section 22 of the component mounter 12 linked to the unit ID, and then the program ends.

With a first embodiment described above, non-volatile storing section 22 configured to rewritably store specific information of a unit and an update date and time of the specific information linked to a unit ID is provided on each of multiple component mounters 12 connected via network 11, and each component mounter 12, when acquiring specific information of the unit loaded on the component mounter, acquires the specific information for which the update date and time is most recent from the specific information of the unit stored in the non-volatile storing sections 22 of the multiple component mounters 12, therefore, each component mounter 12 is able to control operation of the unit using the specific information with the most recent update date and time stored in the storing sections 22 of other component mounters 12, thereby improving control accuracy. Further, because the specific information of the unit and the update date and time of the specific information are stored in storing section 22 of each of the multiple component mounters 12 linked to the unit ID, even in a case in which storing section 22 of one of the component mounters 12 breaks, backup is possible using storage data of storing section 22 of another component mounter 12, resulting in better failsafe ability of the system, without requiring non-volatile memory for saving the specific information to be provided in each unit, thereby satisfying a demand of lower costs for the units. Also, troublesome work of an operator entering specific information of a unit manually no longer needs to be performed, improving productivity, and also preventing human input errors.

Also, each component mounter 12, when specific information of a unit set on the component mounter 12 is measured, stores the specific information of the unit and the update date and time of the specific information linked to the unit ID in storing section 22 of the component mounter 12 itself, and sends the specific information of the unit, the update date and time, and the unit ID all at once to the other component mounters 12 connected via network 11 such that the specific information of the unit, the update date and time, and the unit ID are stored in storing sections 22 of the other component mounters 12, therefore, every time specific information of a unit is measured at one of the multiple component mounters 12 connected via network 11, it is possible to update the specific information of the unit and the update date and time stored in storing sections 22 of all of the component mounters 12 connected via network 11, such that the specific information of the unit and the update date and time stored in storing section 22 of all the component mounters 12 are automatically always updated with the most recent data.

Also, each of the component mounters 12, when acquiring the specific information of the unit corresponding to the unit ID read by ID reading section 21 from ID recording section 17 to 20 of the unit set on the component mounter 12, acquires the specific information for which the update date and time is most recent from the specific information of the unit stored in storing sections 22 of all the component mounters 12 connected via network 11, or acquires the specific information of the unit by measuring the specific information of the unit, therefore each component mounter 12, when acquiring the specific information of a unit set on the component mounter 12 itself, always acquires the most recent specific information.

Second Embodiment

Next, a second embodiment of the present disclosure will be described using FIGS. 6 and 7. However, for portions which are practically the same as the above first embodiment, the same symbols are used and explanations are omitted or abbreviated, with largely the sections which are different being described.

Figure 6:
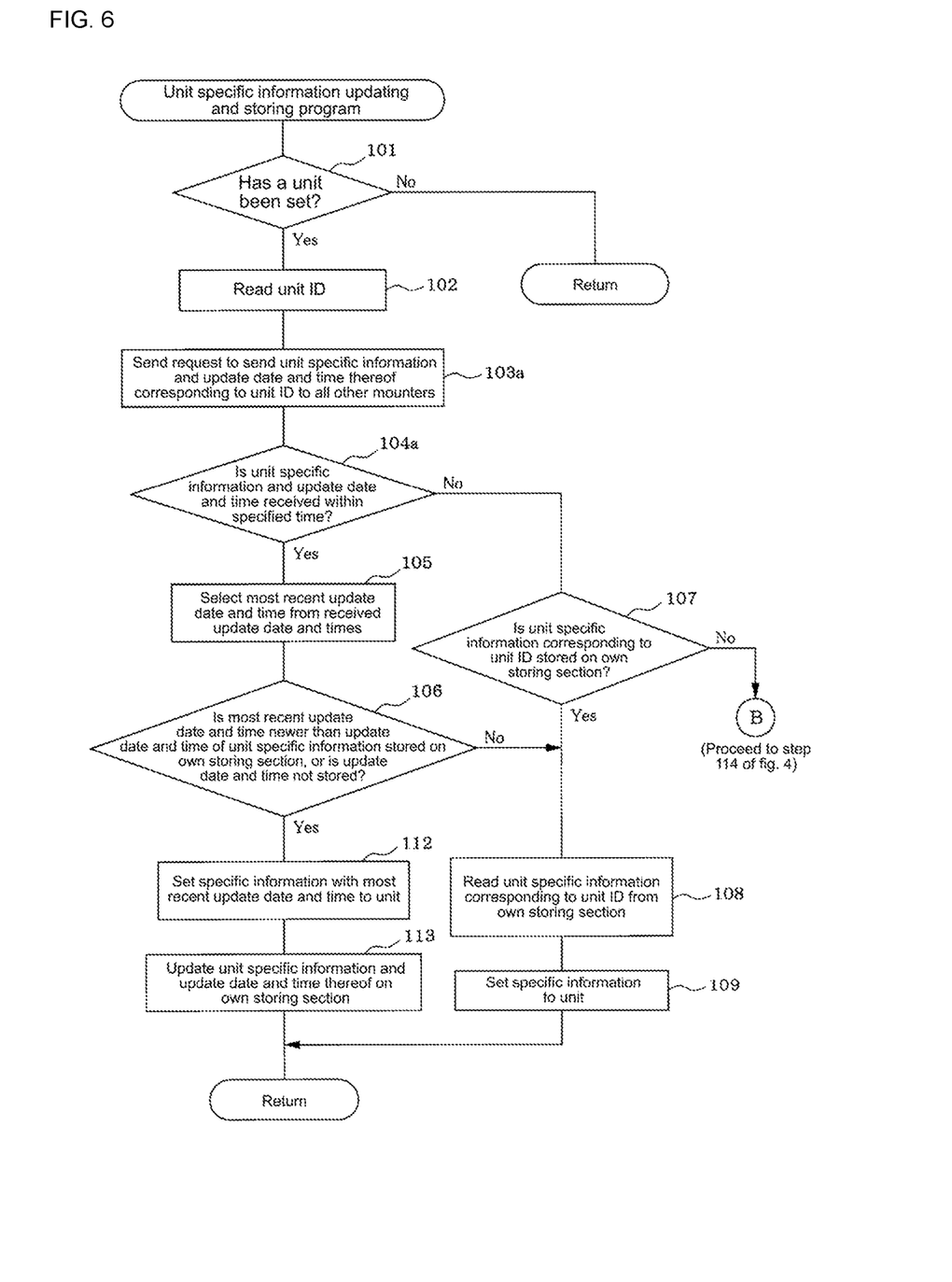
FIG. 6 is a flowchart showing a flow of processing of the main portions of a unit specific information updating and storing program of a second embodiment.
Figure 7:
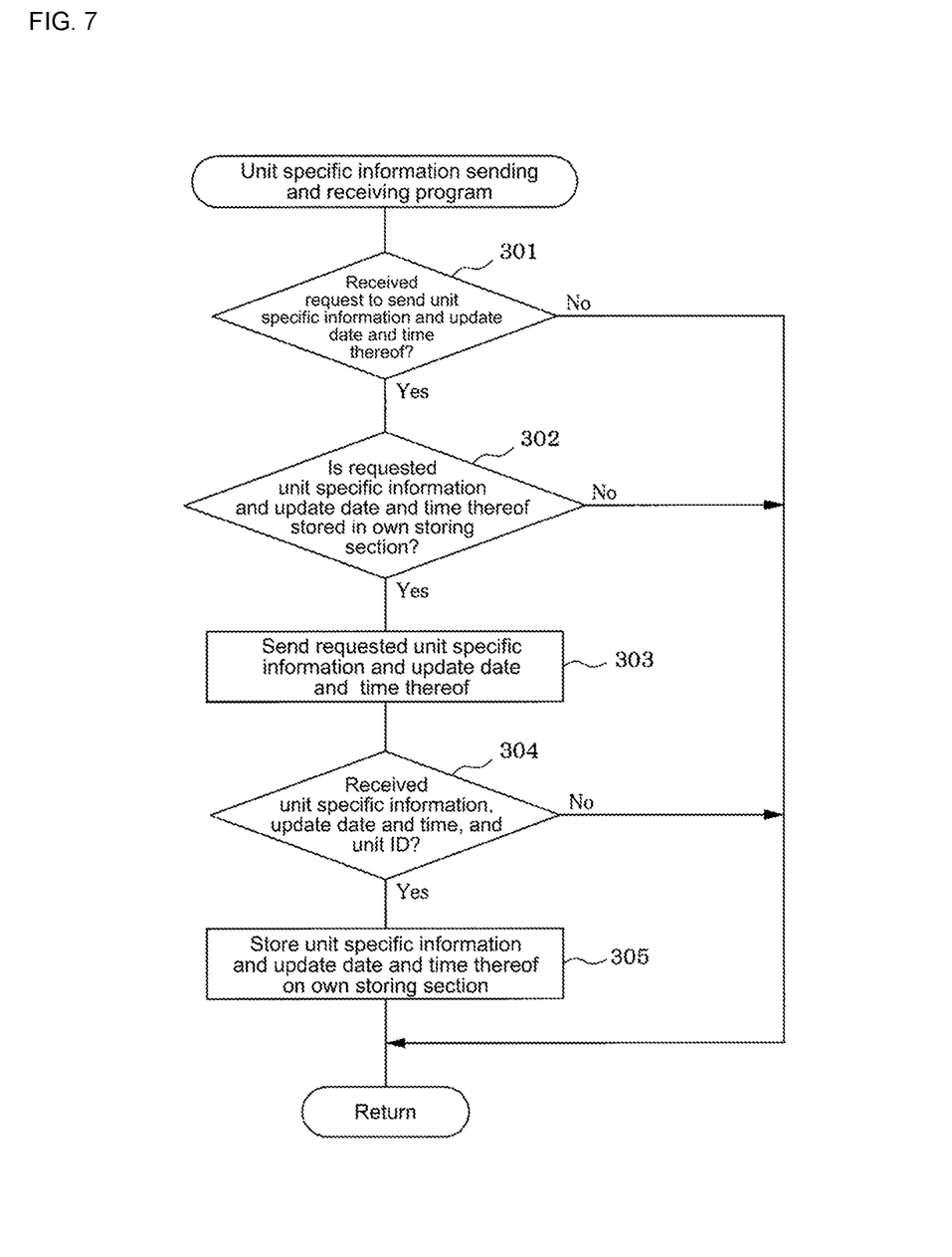
FIG. 7 is a flowchart showing a flow of processing of a unit specific information sending and receiving program of the second embodiment.

In the first embodiment, a request to send the update date and time of the specific information of the unit and a request to send the specific information of the unit are issued to the other component mounters 12 separately, but with a second embodiment of the present disclosure, by control device 25 of each component mounter 12 periodically performing the unit specific information updating and storing program of FIG. 6 and the unit specific information sending and receiving program of FIG. 7, the request to send the specific information of the unit and the update date and time of the specific information of the unit is issued to the other component mounters 12 at the same time, and in a case in which the update date and time of the specific information of the unit sent from the other component mounter 12 is more recent than the update date and time of the specific information of the unit stored in storing section 22 of the component mounter 12 that issued the request, or in a case in which the specific information of the unit is not stored in storing section 22 of the component mounter 12 that issued the request, the component mounter 12 stores the specific information of the unit and the update date and time sent from the other component mounter 12 in its own storing section 22. Processing of the programs of FIGS. 6 and 7 are described below.

Unit Specific Information Updating and Storing Program

The unit specific information updating and storing program of FIG. 6 performs the same processing in each step as the specific information updating and storing program of FIGS. 2 to 4 as described in the first embodiment above, but with the processing of steps 103 and 104 changed to the processing of steps 103a and 104a respectively, and the processing of steps 110 and 111 omitted.

The unit specific information updating and storing program of FIG. 6 is performed periodically by control device 25 of each component mounter 12 connected via network 11. When the program is started, in steps 101 and 102, after the unit ID has been read from ID recording section (one of 17 to 20) of a unit set on the component mounter 12, proceeding to step 103, a request to send the unit specific information and the update date and time of the unit specific information corresponding to the read unit ID is sent all at once to all the other component mounters 12 connected via network 11, and in step 104a it is determined whether the unit specific information and the update date and time of the unit specific information corresponding to the unit ID has been received within a specified time. Subsequent processing of steps 105 to 109 is the same as in the first embodiment.

Then, in step 106, in a case in which it is determined that the received most recent update date and time is more recent than the update date and time of the unit specific information stored in storing section 22 of the component mounter 12 that issued the request, or if it is determined that the unit specific information is not stored in storing section 22 of the component mounter 12 that issued the request, processing proceeds to step 112, and the unit specific information with the most recent update date and time received by the processing of the unit specific information sending and receiving program of FIG. 7 is set to the unit, and in step 113, the unit specific information and the update date and time are stored in storing section 22 of the component mounter 12 that issued the request, and then the program ends.

Unit Specific Information Sending and Receiving Program

The unit specific information sending and receiving program of FIG. 7 is performed periodically by control device 25 of each component mounter 12 connected via network 11. When the program is started, first, in step 301, it is determined whether a sending request for the unit specific information and the update date and time of unit specific information sent from another component mounter 12 connected via network 11 has been received, and if it has not been received, the program ends without performing subsequent processing.

Then, when the sending request of the unit specific information and the update date and time of the unit specific information is received, proceeding to step 302, it is determined whether the requested unit specific information and the update date and time of the unit specific information are stored in storing section 22 of the component mounter 12, and if they are not stored, the program ends without performing subsequent processing.

In contrast, in step 302, if it is determined that the requested unit specific information and the update date and time of the unit specific information are stored in storing section 22 of the component mounter 12, proceeding to step 304, it is determined whether the unit specific information, the update date and time, and the unit ID sent all at once from the other component mounters 12 when the unit specific information was measured at the other component mounter 12 has been received, and if they have has not been received, the programs ends as is, but if they have been received, processing proceeds to step 305, the unit specific information and the update date and time are stored in storing section 22 of the component mounter 12 linked to the unit ID, and then the program ends. With the second embodiment described above, it is possible to obtain the same effects as the first embodiment.

Note that, the applicable range of the present disclosure is not limited to a system in which multiple component mounters 12 are connected by network 11, and may be applied regardless of the types of devices and units so long as the system is for managing specific information of multiple devices that are attachable to any one of multiple devices that are connected via a network. Also, the network is not limited to a single network within a factory, and the disclosure may be applied to a system in which multiple factories are connected by a network.

Also, in the first and second embodiments above, the specific information of the unit is measured in a case in which the specific information of a unit set on a component mounter 12 is not stored in storing section 22 of any of the component mounters 12, but even if the specific information of a unit is stored in storing section 22, when a specified condition is satisfied (for example, the most recent update date and time is older than a specified date and time), the specific information of the unit may be measured.

The present disclosure is not limited to the configurations of the first and second embodiments above, and it goes without saying that various other changes that do not depart from the scope of the disclosure may be made, such as appropriate changes may be made to the order of processing of each step of the programs of FIGS. 2 to 7.

REFERENCE SIGNS LIST

11: network; 12: component mounter (device); 13: component supply device (unit); 14: mounting head (unit); 15: nozzle changer (unit 9; 16: XY robot (unit); 17 to 20: ID recording section; 21: ID reading section; 22: non-volatile storing section; 25: control device

The invention claimed is:

1. A unit specific information management system for managing specific information of multiple units comprising:
    multiple component mounters for mounting or attaching components to a circuit board connected via a network; and
    the multiple units configured to be exchangeably attached to any one of the multiple component mounters, the units being any one of a component supply device, a mounting head, a nozzle changer, or an XY robot, wherein
    each of the units is provided with an ID recording section configured to store or record identification information (unit ID) of the units,
    each of the component mounters is provided with an ID reading section configured to read the unit ID from the ID recording section of the unit attached on the component mounter, and a non-volatile storing section configured to rewritably store the unit specific information of the unit attached on the component mounter and an update date and time of the unit specific information linked to the unit ID,
    each component mounter includes a control device which configured to control operation of each unit attached on the component mounter during production based on the unit specific information of each unit attached on the component mounter, the unit specific information including at least one of calibration data, control parameters, and initial values, and
    each control device is configured to update the unit specification information by being further configured to
        issue a request to another component mounter connected via the network to send the update date and time of the unit specific information of the unit corresponding to the unit ID read by the ID reading section from the ID recording section of the unit attached on the component mounter,
        determine whether the update date and time of the unit specific information is received within a specified time, the specified time being a time required to complete receiving of the update date and time of the unit specific information from all of the other component mounters connected via the network,
        when the update date and time of the unit specific information is received within the specified time and when the update date and time of the unit specific information of the unit sent from the another component mounter in accordance with the request is more recent than the update date and time of the unit specific information of the unit stored in the storing section of the component mounter that issued the request, or when the update date and time of the unit specific information is received within the specified time and when the unit specific information of the unit is not stored in the storing section of the component mounter that issued the request, request the another component mounter to send the unit specific information of the unit with the more recent update date and time to the component mounter, set the unit specific information of the unit with the more recent update date and time for the unit, and store the unit specific information of the unit with the more recent update date and time and the update date and time sent from the another component mounter in accordance with the request in the storing section of the component mounter,
        when the update date and time of the unit specific information is received within the specified time and when the update date and time of the unit specific information of the unit sent from the another component mounter in accordance with the request is not more recent than the update date and time of the unit specific information of the unit stored in the storing section of the component mounter that issued the request, or when the update date and time of the unit specific information is not received within the specified time and when the unit specific information of the unit is stored in the storing section of the component mounter that issued the request, read the unit ID from the ID recording section of the unit attached on the component mounter that issued the request and set the unit specific information of the unit that is stored in the storing section of the component mounter that issued the request, and
        when the update date and time of the unit specific information is not received within the specified time and when the unit specific information of the unit is not stored in the storing section of the component mounter that issued the request, measure the unit specific information, set the measured unit specific information for the unit, store the measured unit specific information and the update date and time of the measured unit specific information in the storing section of the component mounter that issued the request, and send the unit specific information, the update date and time, and the unit ID to the another component mounter via the network.

2. A unit specific information management system for managing specific information of multiple units comprising:

multiple component mounters for mounting or attaching components to a circuit board connected via a network; and the multiple units configured to be exchangeably attached to any one of the multiple component mounters, the units being any one of a component supply device, a mounting head, a nozzle changer, or an XY robot, wherein each of the units is provided with an ID recording section configured to store or record identification information (unit ID) of the units, each of the component mounters is provided with an ID reading section configured to read the unit ID from the ID recording section of the unit attached on the component mounter, and a non-volatile storing section configured to rewritably store the specific information of the unit attached on the component mounter and an update date and time of the specific information linked to the unit ID, each component mounter includes a control device which configured to control operation of each unit attached on the component mounter during production based on the specific information of each unit attached on the component mounter, the specific information including at least one of calibration data, control parameters, and initial values, and each control device is configured to update the specification information of the unit by being further configured to issue a request to another component mounter connected via the network to send the specific information and the update date and time of the specific information of the unit corresponding to the unit ID read by the ID reading section from the ID recording section of the unit attached on the component mounter, determine whether the update date and time of the unit specific information is received within a specified time, the specified time being a time required to complete receiving of the update date and time of the unit specific information from all of the other component mounters connected via the network, when the update date and time of the unit specific information is received within the specified time and when the update date and time of the specific information of the unit sent from the another component mounter in accordance with the request is more recent than the update date and time of the specific information of the unit stored in the storing section of the component mounter that issued the request, or when the update date and time of the unit specific information is received within the specified time and when the specific information of the unit is not stored in the storing section of the component mounter that issued the request, store the specific information of the unit and the update date and time sent from the another component mounter in the storing section of the component mounter, when the update date and time of the unit specific information is received within the specified time and when the update date and time of the specific information of the unit sent from the another component mounter in accordance with the request is not more recent than the update date and time of the specific information of the unit stored in the storing section of the component mounter that issued the request, or when the update date and time of the unit specific information is not received within the specified time and when the specific information of the unit is stored in the storing section of the component mounter that issued the request, read the unit ID from the ID recording section of the unit attached on the component mounter that issued the request and set the specific information of the unit that is stored in the storing section of the component mounter that issued the request, and when the update date and time of the unit specific information is not received within the specified time and when the specific information of the unit is not stored in the storing section of the component mounter that issued the request, measure the unit specific information, set the measured unit specific information for the unit, store the measured unit specific information and the update date and time of the measured unit specific information in the storing section of the component mounter that issued the request, and send the unit specific information, the update date and time, and the unit ID to the another component mounter via the network.

3. The unit specific information management system of claim 1, wherein for each of the devices, when the specific information of the unit set on the device is measured, the control device is configured to store the specific information of the unit and the update date and time of the specific information linked to the unit ID in the storing section of the device itself, and send the specific information of the unit, the update date and time of the specific information, and the unit ID to the another device connected via the network and store the specific information of the unit, the update date and time of the specific information, and the unit ID in the storing section of the another device.

4. The unit specific information management system according to claim 1, wherein for each of the devices, when acquiring the specific information of the unit corresponding to the unit ID read by the ID reading section from the ID recording section of the unit set on the device, the control device is configured to acquire the specific information for which the update date and time is most recent from the specific information of the unit stored on the storing sections of all the devices connected via the network, or acquire the specific information of the unit by measuring the specific information of the unit.

5. The unit specific information management system of claim 2, wherein for each of the devices, when the specific information of the unit set on the device is measured, the control device is configured to store the specific information of the unit and the update date and time of the specific information linked to the unit ID in the storing section of the device itself, and send the specific information of the unit, the update date and time of the specific information, and the unit ID to the another device connected via the network and store the specific information of the unit, the update date and time of the specific information, and the unit ID in the storing section of the another device.

6. The unit specific information management system according to claim 2, wherein
for each of the devices, when acquiring the specific information of the unit corresponding to the unit ID read by the ID reading section from the ID recording section of the unit set on the device, the control device is configured to acquire the specific information for which the update date and time is most recent from the specific information of the unit stored on the storing sections of all the devices connected via the network, or acquire the specific information of the unit by measuring the specific information of the unit.

* * * * *